United States Patent [19]

Seymour et al.

[11] Patent Number: 4,698,577
[45] Date of Patent: Oct. 6, 1987

[54] METHOD OF DIGITAL FLUX RECONSTRUCTION WITH DC ELIMINATION

[75] Inventors: Robert A. Seymour; Allen M. Ritter, both of Charlottesville, Va.; Richard A. Kellogg, Syracuse, N.Y.; John D. D'Atre, Earlysville, Va.

[73] Assignee: General Electric Company, Charlottesville, Va.

[21] Appl. No.: 819,279

[22] Filed: Jan. 16, 1986

[51] Int. Cl.$^4$ .............................................. H02P 5/40
[52] U.S. Cl. ............................ 318/805; 324/158 MG
[58] Field of Search ....................... 318/800, 803, 805; 324/158 MG; 364/481, 483

[56] References Cited

U.S. PATENT DOCUMENTS

| | | | |
|---|---|---|---|
| 4,338,559 | 6/1982 | Blaschke et al. | 318/805 |
| 4,399,395 | 8/1983 | Espelage | 318/803 |
| 4,456,868 | 6/1984 | Yamamura et al. | 318/800 |
| 4,503,375 | 3/1985 | Okuyama | 318/808 |
| 4,511,978 | 4/1985 | Reng | 318/808 |
| 4,593,240 | 6/1986 | Blaschke | 318/800 |

*Primary Examiner*—David Smith, Jr.
*Attorney, Agent, or Firm*—James H. Beusse; Irving M. Freedman

[57] ABSTRACT

A method for developing current control signals from motor terminal voltage in the control of alternating current electric motors which utilize electric current control signals oriented to the phase of a flux component in a rotating field for applying current so as to control the flux and torque in the motor. The method includes developing flux signals from measurement of motor terminal voltage and integrating those signals to develop corresponding flux signals. In one form, the method eliminates DC components occuring in the resultant flux signals by locating local maxima and minima of the resultant flux signal and correcting the value of the flux integrator so as to provide maxima and minima flux signals having equal absolute values. The method also includes establishing an initial flux in the motor prior to startup which is oriented in a predetermined manner such that initial current applied to the motor can be applied so as to immediately develop torque, if required. The method further provides for initializing the flux integrators and associated logic such that discontinuities attributable to events such as frequency reversals are avoided.

9 Claims, 11 Drawing Figures

MAIN ROUTINE

DC DETECT AND CORRECT:

DC_CORRECT_BIT = DC_CORRECT_BIT + PEAK_FOUND_BIT
PEAK_FOUND_BIT = 0
If ( LOOKING_FOR_MAX=0)

Call CHECK_MIN

Else

Call CHECK_MAX

Endif

If (DC_CORRECT_BIT * /PEAK_FOUND BIT )

Call LONG_TERM

Endif
End

Subroutine CHECK_MIN:
___

If ( FLUX < MIN )

MIN = FLUX

Else

If ( FLUX > MIN + THRESHOLD )

Call INCORPORATE_PEAK
PEAK_FOUND_BIT = 1
LOOKING_FOR MAX = 1
MAX = FLUX

Endif

Endif

End

Subroutine CHECK_MAX:
___

If ( FLUX > MAX )

MAX = FLUX

Else

If ( FLUX < MAX - THRESHOLD )

Call INCORPORATE_PEAK
PEAK_FOUND_BIT = 1
LOOKING_FOR MAX = 0
MIN = FLUX

Endif

Endif

End

Subroutine INCORPORATE_PEAK:
___

DC = (MAX+MIN)/2
MIN = MIN - DC
MAX = MAX - DC
FMAG = MAX
FMAG = FLUX - DC
End

Subroutine LONG_TERM:
___

VOF = VOF + $K_2$*DC
LIMIT VOF
DC_CORRECT_BIT = 0
End

FIG.5

| QUADRANT | CONDITION ROTATION | NEXT PEAK ALPHA | BETA | NECESSARY ACTION |
|---|---|---|---|---|
| 1 | POSITIVE | MINIMUM | MAXIMUM | ACTION "A" |
| 2 | POSITIVE | MINIMUM | MINIMUM | ACTION "B" |
| 3 | POSITIVE | MAXIMUM | MINIMUM | ACTION "C" |
| 4 | POSITIVE | MAXIMUM | MAXIMUM | ACTION "D" |
| 1 | NEGATIVE | MAXIMUM | MINIMUM | ACTION "C" |
| 2 | NEGATIVE | MAXIMUM | MAXIMUM | ACTION "D" |
| 3 | NEGATIVE | MINIMUM | MAXIMUM | ACTION "A" |
| 4 | NEGATIVE | MINIMUM | MINIMUM | ACTION "B" |

| ACTION | ALPHA PHASE | | | BETA PHASE | | |
|---|---|---|---|---|---|---|
| | LOOKING FOR MAX | MAX | MIN | LOOKING FOR MAX | MAX | MIN |
| "A" | FALSE | +FMAG | FLUX_ALPHA | TRUE | FLUX_BETA | -FMAG |
| "B" | FALSE | +FMAG | FLUX_ALPHA | FALSE | +FMAG | FLUX_BETA |
| "C" | TRUE | FLUX_ALPHA | -FMAG | FALSE | +FMAG | FLUX_BETA |
| "D" | TRUE | FLUX_ALPHA | -FMAG | TRUE | FLUX_BETA | -FMAG |

FIG.9

METHOD OF DIGITAL FLUX RECONSTRUCTION WITH DC ELIMINATION

BACKGROUND OF THE INVENTION

This invention relates to a method of measuring the rotor flux of a dynamoelectric machine by measuring the terminal voltage of the machine.

Many synchronous and induction motor control schemes such as vector control and sin $\theta$ controls use an estimate of the phase and amplitude of the rotor flux in determining motor torque and to generate frequency and current commands for the machine. In motor controls such as vector controls, the phase and magnitude of the flux must be accurately known since flux is produced by providing current in phase with the motor flux and torque is produced when flux and current are ninety degrees out of phase.

One method of measuring rotor flux is to use flux coils embedded in each phase of the motor stator as described in Franz et al, U.S. Pat. No. 4,011,489. However, this method is only available for motors specially constructed for flux control. It is desireable, therefore, to provide a method of flux control which can be applied to a standard alternating current motor.

If the voltage across the magnetizing reactance of a motor is integrated by an ideal integrator, the rotor flux is obtained. The voltage across the magnetizing reactance in a motor, however, cannot be measured directly. What can be measured is the total terminal voltage of the motor which can be represented as the sum of voltages due to stator resistance and leakage reactance in series with the induced CEMF (counterelectromotive force). The stator resistance cannot be easily compensated for since it varies as a function of temperature. Furthermore, the terminal voltage measurement is not exact due to minor voltage offsets in the voltage measuring circuits.

One approach for generating a flux signal from motor terminal voltage is to use a low pass filter as an integrator. At low frequencies, the low pass filter has a finite gain. The rotor flux is a sinusoidal varying signal which ideally has a long term average value of zero. If the voltage measuring circuit including the filter introduces any offset, the integrated signal will have a non-zero average value producing inaccurate results. When a low pass filter is used, precision voltage sensors with an accuracy greater than 0.1 percent are usually required.

Another approach to flux reconstruction, disclosed in Blaschke's German Pat. No. 1806769, is to use an integrator with a proportional plus integral feedback loop to generate a signal with a zero time average. The time constant of the proportional plus integral feedback has to be sufficiently large to provide averaging at low frequencies which in turn provides low gain and sluggish response. Distortion of the flux phase information occurs at low frequencies since the circuit is not an ideal integrator.

Yet another approach, disclosed in Dreiseitl et al, U.S. Pat. No. 4,282,473, is to use an adaptive notch filter to perform machine terminal voltage integration to avoid deterioration in performance at low frequencies. However, such technique introduces additional filter elements which may give rise to other offset problems. Furthermore, the motors are operated over a wide frequency range in which the notch filter is not utilized.

It is an object of the present invention to provide an improved method of obtaining flux information from motor terminal voltage.

It is an object of the present invention to generate a flux signal from the motor terminal voltage that provides DC elimination synchronous to the flux wave.

It is a further object of the present invention to generate a flux signal from terminal voltage that provides accurate phase information from low precision sensors.

It is a further object of the present invention to generate a flux signal from terminal voltage that provides DC elimination during rapidly changing rotor speeds.

SUMMARY OF THE INVENTION

In one aspect of the present invention a method of developing a flux signal indicative of flux in a dynamoelectric machine is provided. A machine voltage at the machine terminals is measured and a signal proportional to the machine voltage is integrated to generate a flux signal. The local maxima and minima of the flux signal are detected and the drift of the actual waveform from the desired zero axis of the flux signal is determined each half cycle from the last maxima and minima detected. The DC component found in the flux signal is subtracted from the signal proportional to terminal voltage, prior to integrating the signal proportional to terminal voltage, thereby providing a reconstructed flux signal with the DC component eliminated.

BRIEF DESCRIPTION OF THE DRAWING

While the specification concludes with claims particularly pointing out and distinctly claiming the present invention, the objects and advantages of the invention can be more readily ascertained from the following description of a preferred embodiment, taken in conjunction with the accompanying drawing in which:

DETAILED DESCRIPTION OF THE INVENTION

Figure 1:
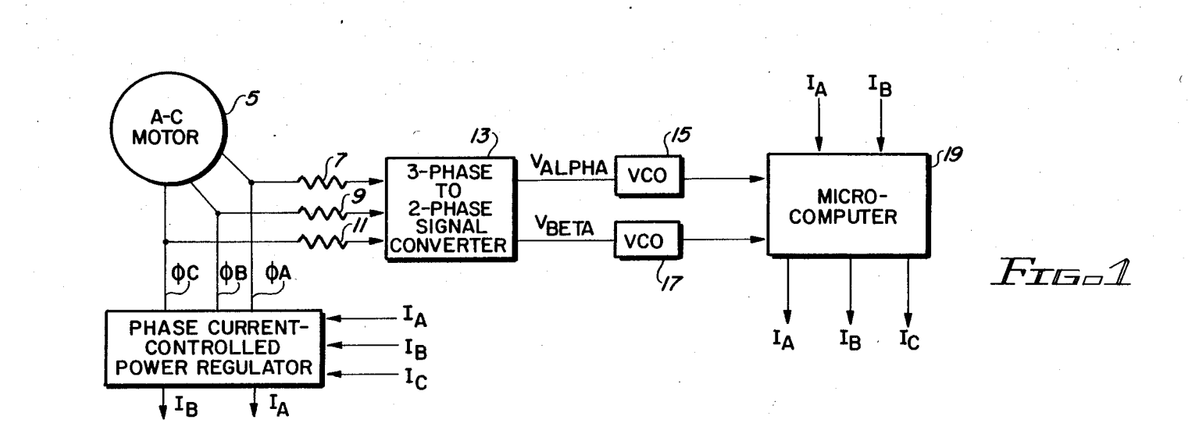
FIG. 1 is a part block diagram, part schematic representation of hardware used in the digital flux reconstruction method in accordance with the present invention.
Figure 2:
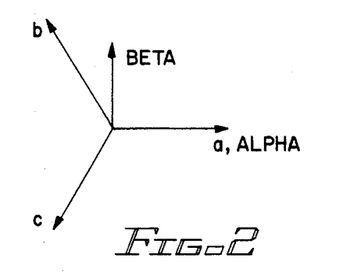
FIG. 2 is a vector diagram showing the relationship between a three phase representation of stator voltages and a two phase representation stator voltages.

Referring now to the Figures and particularly FIG. 1 thereof, three phase voltages A, B and C are coupled to a dynamoelectric machine shown in the present embodiment as an induction motor 5. The three phase voltages are also coupled through high impedance voltage feedback resistors 7, 9 and 11, to analog hardware 13 which provides a two phase representation of the stator voltage. The two phases in the two phase representation are designated ALPHA and BETA. ALPHA is in phase with motor phase A and BETA is displaced ninety degrees from ALPHA in the direction of the three phase ABC rotation. A vector diagram showing the relationship between the two coordinate systems is shown in FIG. 2. No information is lost in this coordinate system change since the three phases A, B and C contain redundant information in the representation of a vector in two dimensional space. The ALPHA and BETA axes may be thought of as abscissa and ordinate axes mounted on the stator with the origin of the coordinate systems situated on the shaft of the motor. The ALPHA and BETA voltage feedback signals provided by the analog hardware represent the components of the stator voltage in phase with the ALPHA and BETA axis, respectively.

The ALPHA and BETA analog voltage feedback signals from the analog hardware 13 are coupled to voltage controlled oscillators (VCO) 15 and 17, respectively, which provide digital pulse train signals to two internal counters of a microcomputer 19, such as Intel 8051.

Figure 3:
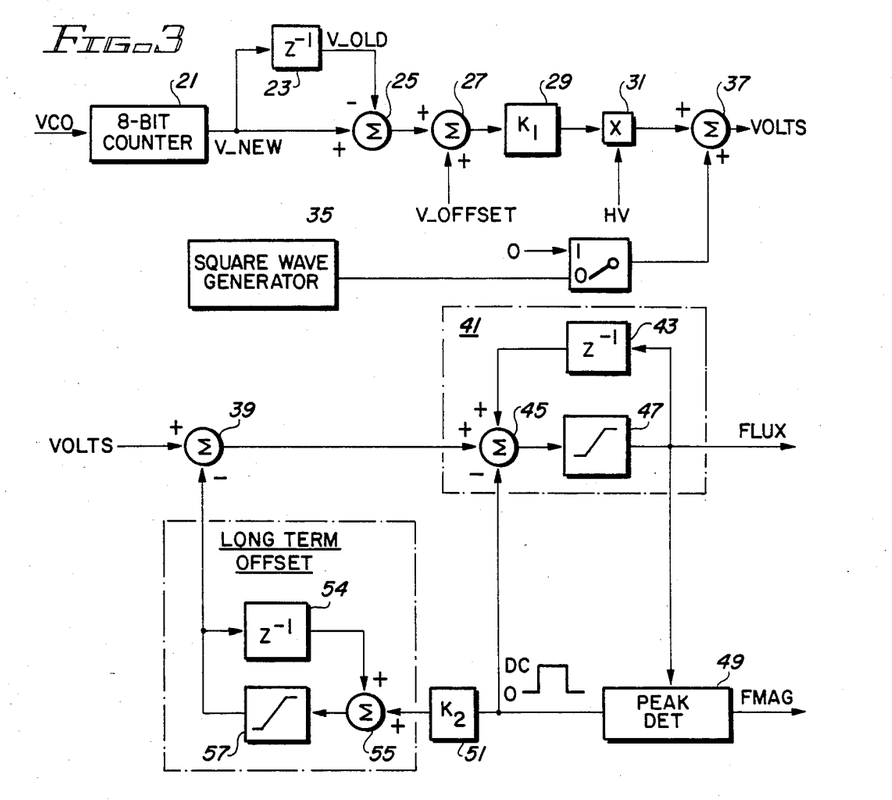
FIG. 3 is a block diagram representation of the discrete data flow occurring in the microcomputer of FIG. 1 according to the present invention.

Referring now to FIG. 3 a block diagram showing discrete data flow in the microcomputer 19 is shown for the ALPHA signal. Although the following discussion will refer to discrete devices for performing the described functions, it should be understood that the devices are identified only for ease of illustration and may not have a fixed counterpart within the structure of the microcomputer. One of the internal counters in the microcomputer is shown as a free running 8 bit counter 21. The counter 21 is sampled and a difference in the count since the last sample provides a representation of the average voltage during the last sampling interval for the ALPHA component.

The sampling is accomplished using a delay element 23 which delays the signal V_NEW until the next time the 8 bit counter is sampled. At that time, the most recently sampled signal V_NEW is compared to the previously sampled signal V_OLD in summing device 25. The delay element 23 and summing device 25 are configured as a differentiator with the difference determination performed every sampling interval. A typical sampling interval may be 1.5 milliseconds.

The average voltage signal from the differentiator is summed with a voltage offset signal in a summing device 27 to correct for a voltage offset in the voltage controlled oscillator. The VCO offset is introduced to provide a counting range which is not centered about zero since the counter 21 cannot recognize the concept of negative counts. A scale factor is applied to the signal from device 27 in block 29 and the scaled $V_{DIFF}$ signal is coupled to a multiplying device 31.

A variable HV, which is a normalizing scale factor, can be utilized when the reconstructed flux signal is used as a feedback signal in a flux regulator having a constant command value. Varying HV varies the command flux value. Below motor base speed, HV is adjusted so that the flux in the motor is correct. Above base speed, field weakening is accomplished by increasing HV according to the ratio of excitation frequency to base frequency.

The VCO 15 and counter 21 will be recognized to form an integrator which integrates the motor voltage signals (ALPHA and BETA in identical circuits). The $V_{DIFF}$ signal is a differentiated signal so that the net result of the processing is to provide a reproduction in digital form of the input analog voltage. During motor operation, the signal from multiplier 31 is passed through to summing junction 39. A summing junction 37 is used prior to startup to couple a synthesized flux signal from a square wave generator 35 through a switch 33 to the flux control apparatus for the purpose of nulling measurement offsets.

The signal from multiplier 31 is corrected by a long term DC offset, to be discussed hereinafter, in summing junction 39. The corrected signal is next integrated in integrator 41. Integrator 41 comprises digital delay block 43 which adds the sum of all the previously sampled, corrected voltages, i.e., an output flux signal, to the presently sampled voltage in summing junction 45 to generate the flux signal. Since block 43 adds the old value of flux to the new volts signal, the output signal of block 41 is the integral of the motor voltage, i.e., the motor flux. A limit device 47 clamps the upper and lower permissable values of the flux signal. The flux signal, which is sinusoidal with a DC offset, is coupled to a peak detect circuit 49 where the minima and maxima of the flux signal are determined. When a peak is detected, the value of the peak is added to the previously detected peak in order to obtain the DC component which is equal to one half of the sum of the maximum and minimum flux values. The DC component is immediately injected through a summing junction 45 where it is subtracted from the flux signal to provide an instantaneous DC correction to prevent the integrator 41 from saturating and to correct the value of the flux signal.

Figure 4A:
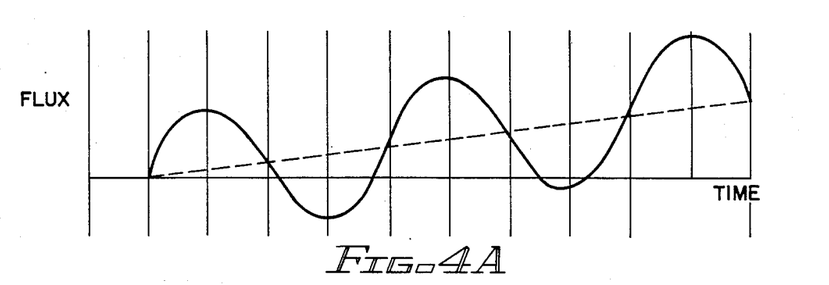
FIGS. 4A, 4B and 4C show waveform diagrams on a common time scale without drift correction, with instantaneous drift correction and with long-term drift correction, respectively, helpful in explaining the operation of the present invention.
Figure 4B:
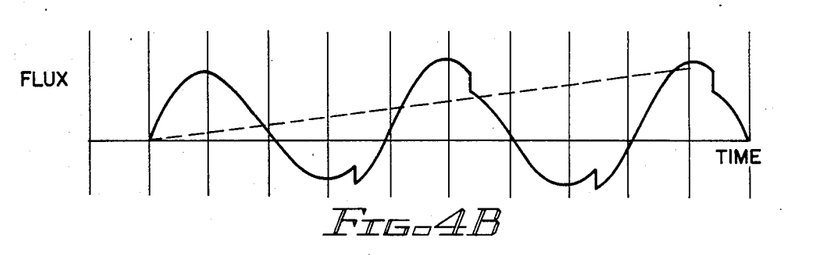
Figure 4C:
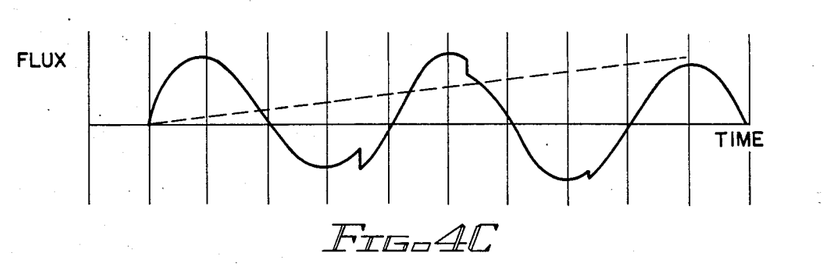

Referring now to FIGS. 4A, B and C, FIG. 4A shows the waveform of the flux signal obtained by integrating stator voltage without correction for DC offset, i.e., drift of the actual waveform from the desired zero axis. An integrator receiving this signal will saturate, due to the DC component resulting from the inaccuracies of the sensors that measure the voltage and other voltage shifts due to factors and offsets. FIG. 4B shows the effect of an instantaneous correction performed every half cycle to remove the DC offset determined from the detected maxima and minima. This correction is indicative of the correction implemented periodically by detector 49 through junction 45.

A further improvement in the flux signal can be made by using a long term offset in addition to the correction made every one half cycle. Each half cycle when a peak is detected, the correction signal is also coupled through a gain block 51 to an integrator 53. Integrator 53 comprises a delay element 54 which provides the sum of all the previous long term DC corrections to a summing junction 55 where the value of the latest gain adjusted DC correction is added. The output of junction 55 passes through a limit block 57 which ensures that the long term DC correction signal is limited to predetermined upper and lower bounds. The DC correction signal is integrated in integrator 53 to provide a long term DC correction signal which is subtracted from each voltage signal in junction 39, reducing the DC offset found by the peak detector during steady state conditions. The peak detector continues to provide instantaneous corrections after a peak is found and the long term correction signal is modified as needed after each peak is found. Typically, the gain of block 51 is much less than one so that the long term correction tends to compensate for offsets without overshooting the desired value, i.e., it tends to be a stabilizing function. FIG. 4C illustrates the effects of both instantaneous correction and long-term correction. It should be noted that the effects of long-term correction through block 53 is to reduce the degree of subsequent instantaneous corrections. The operation of the peak detector together with the instantaneous and long term corrections is shown in detail in the pseudo code of FIG. 5.

The outputs of the block diagram of FIG. 3 are an ALPHA flux component from integrator 41 which is generally sinusoidal and a flux magnitude signal (FMAG) equal to the absolute value of the most recently detected peak. The BETA component of the flux and the BETA flux magnitude are developed in the same way as the ALPHA components. The BETA component is determined from the output of voltage controlled oscillator 17. Note that the variable FMAG is common to both ALPHA and BETA phases.

Figure 5:
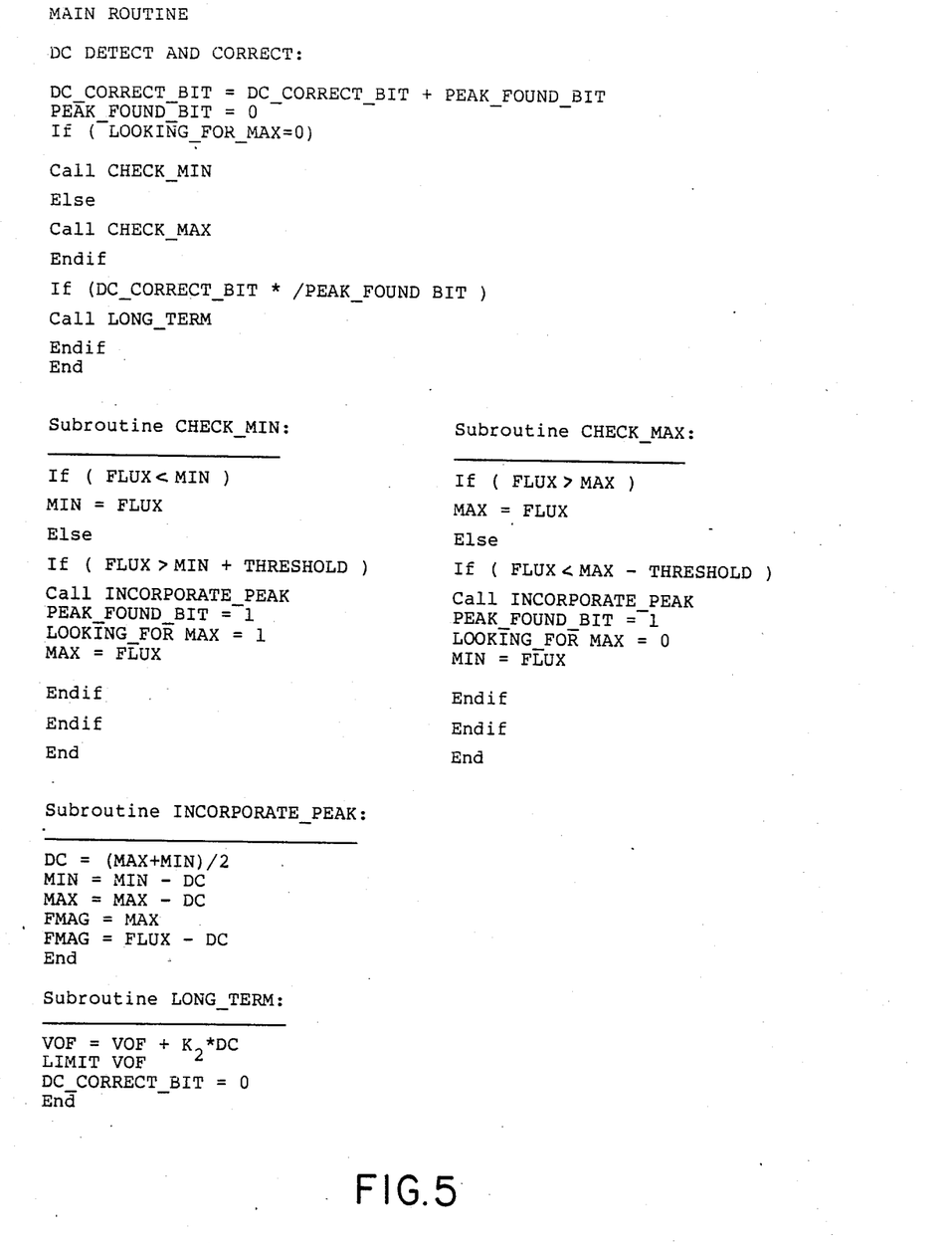
FIG. 5 is a pseudo code representation of the detection of drift of the actual waveform from the desired zero axis in the flux signal and its correction in accordance with the present invention.

The pseudo code is shown having a main routine DC DETECT AND CORRECT and four subroutines CHECK_MIN, CHECK_MAX, INCORPORATE_PEAK, AND LONG_TERM. The four subroutines are called as needed. Initially, the DC_CORRECT_BIT is zero and the PEAK_FOUND_BIT is zero. The DC_CORRECT_BIT is defined as the value of the DC_CORRECT_BIT combined in logic OR operation with the PEAK_FOUND_BIT flag. In this first pass, this sets DC_CORRECT_BIT to zero. If the DC DETECT and CORRECT routine is looking for a minima, the CHECK_MIN subroutine is called. The subroutine ckecks for decreasing values of sampled flux and, if the flux is decreasing, the variable MIN is set equal to the reduced value of the detected flux. The subroutine then is completed and operation returns to the main routine where the BOOLEAN combination of DC_CORRECT BIT*/PEAK_FOUND_BIT is evaluated. Since the DC_CORRECT_BIT is zero, the expression is not true and the main routine begins again. The CHECK_MIN subroutine is again called to determined when the flux stops decreasing and begins to increase above the minimum value by a predetermined threshold. On the pass through the subroutine when this occurs, a different subroutine is called, namely INCORPORATE_PEAK, to determine the instantaneous DC correction. Each time the main routine begins, a new value of flux from the most recently sampled voltage is used.

In the INCORPORATE PEAK subroutine, the DC correction is determined as ½ (MAX+MIN) where MAX is the last maximum detected and MIN is the last minimum detected. The minimum value is set equal to the minimum value less the DC correction to determine the true minimum flux. Similarly, the MAX variable is set equal to the maximum less the DC correction to obtain the true maximum flux. The flux magnitude is equal to the corrected maximum flux since the corrected maximum flux is equal to the negative of the corrected minimum flux. At the end of the INCORPORATE PEAK subroutine, operation returns to the CHECK MIN subroutine where the peak found bit is set equal to one. The _LOOKING_FOR_MAX bit is set indicating that a CHECK MIN subroutine has just been completed. The maximum flux variable is set equal to the latest value of the sampled flux.

Returning to the main routine, the Boolean expression DC_CORRECT BIT */PEAK_FOUND_BIT is evaluated. The Boolean expression is true if the DC CORRECT_BIT combined by an AND operator with the complimented PEAK_FOUND_BIT (the "/" means NOT in the expression /PEAK_FOUND_BIT_) is a logical one. Since the DC_CORRECT_BIT is a zero and the PEAK_FOUND_BIT is a one, ANDing zero and not one is a zero. Since the expression is false the main routine is run again from the beginning.

The DC_CORRECT_BIT is set equal to one, the PEAK_FOUND_BIT is set equal to zero and the CHECK_MAX subroutine is run. The most recent value of flux is sampled and if greater than the previously measured value of flux, the max routine is returned to the main routine and the expression DC_CORRECT_BIT */PEAK_FOUND_BIT is again evaluated. Since DC_CORRECT_BIT is one and PEAK_FOUND_BIT is zero, this time the expression DC_CORRECT BIT */PEAK_FOUND_BIT is true and a LONG_TERM correction subroutine is called. A variable VOF is set equal to its previous value plus $K_2$ times the DC correction factor. The gain $K_2$ is less than one and represents the gain of the block 51. The value of VOF is checked not to exceed a predetermined upper or lower limit and the DC correct bit is set equal to zero.

It can be seen that the LONG_TERM correction subroutine will not be called in the same pass through the main routine in which an INCORPORATE_PEAK subroutine is called. This controls the maximum time required for each complete running of the main routine and permits the main routine to be run each time a new flux value is determined from the latest voltage sample. The main subroutine begins again from the beginning and calls the CHECK_MAX subroutine which is repeated until the sampled flux is found to have passed the maximum by a predetermined threshold. The INCORPORATE_PEAK subroutine is again called and the DC correction value determined.

When the DC DETECT & CORRECT routine is first initialized the phase of the flux is not known. Whether a CHECK_MIN or a CHECK_MAX is to be performed first is not known. One way to solve this dilemma is to allow two peaks to be detected and ignore the flux signals and peak values detected. Subsequent flux information will be valid. If the CHECK_MIN subroutine is first called and the flux signal is decreasing the correct minimum will be found. However, if the CHECK_MIN subroutine is first called and the flux signal is increasing an incorrect minimum will be found since the first sample will be set equal to a minimum and a subsequent sample will be found to be greater than the last found minimum by a predetermined value. A maximum will then be checked for and since the flux signal is increasing a true maximum will be found. As can be seen the output of the DC DETECT & CORRECT will be working properly after two half cycles.

As will be appreciated from the above description of the implementation of FIG. 5, the system looks for maximum and minimum values in establishing offset corrections. Prior to startup, it is important to provide offset compensation for DC values that exist at very low startup frequencies. One method of doing this is to introduce a square wave signal which is symetrical about zero at summing junction 37 in FIG. 3. This signal will carry the DC signal up and down at a periodic rate which the peak detector 49 can operate on to establish a long term offset at a steady state value for when the AC drive is enabled. As soon as the drive is enabled, the switch 33 is actuated to block the signal from generator 35 and the system operates as described above.

When it is desired to start the AC motor, an initial pre-flux condition is established by applying DC current to the motor stator. This current is applied at a known orientation for a period sufficient to build flux in the motor in a predetermined orientation. That orientation may be the orientation of flux at the position at which the motor was last stopped or may be some other selected orientation. The essential criteria is that flux orientation be known at the time that the motor drive is enabled. It should be noted that for pre-flux set-up, the signals generated by the flux integrators are ignored. Once the pre-flux condition is established in the motor, the flux integrators are initialized to a state in which their signals correspond to the state of the pre-flux orientation. Based upon that initialization from prior knowledge of flux orientation, the motor can then be excited by applying a current having an orientation that will produce torque immediately rather than merely supporting or producing more flux. The time during which the pre-flux current is applied will vary with the motor rotor time constant and will generally be only a few (2 to 5) time constants to allow flux time to build in the motor rotor. Typical rotor time constants for a motor are in the range of three hundred milliseconds although very large motors may have time constants of one to two seconds.

The primary purpose of pre-flux is to provide a known flux orientation in the motor so that torque can be produced. When a motor has been running and is brought to a stop, it is also advantageous to leave a DC flux producing component on the motor so that in the event it is desireable to start the motor again after only a very short off period, flux will be retained at a known orientation to assist in starting. The time to start may be reduced for short off times by such a practice since it will then not be necessary to preflux the motor and the regulator can be implemented based upon the last known orientation.

Figure 6:
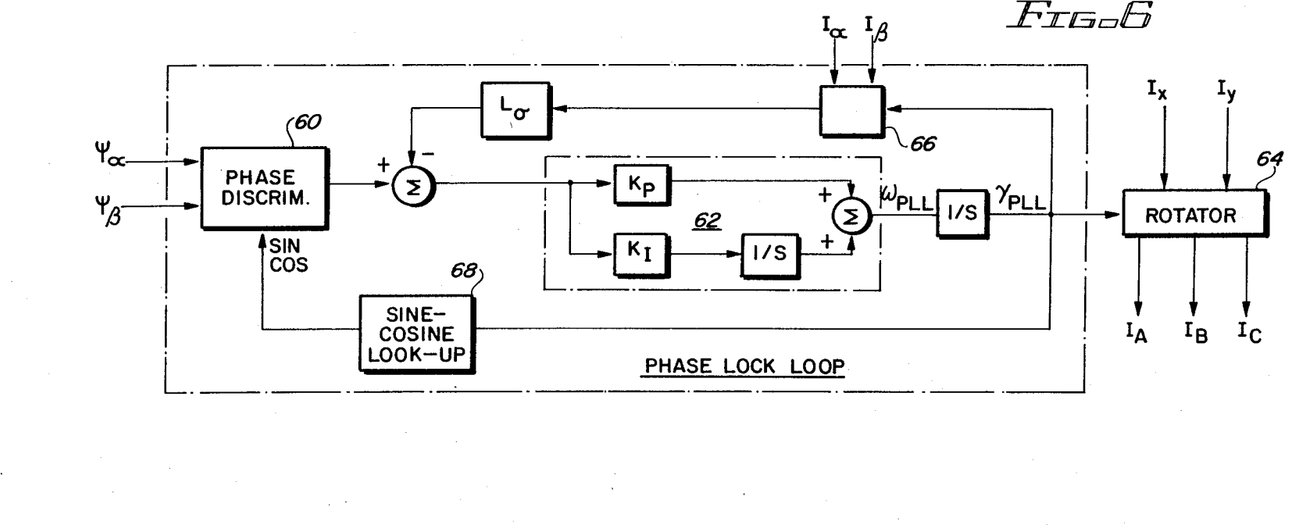
FIG. 6 is a simplified block diagram of a phase lock loop circuit of a type which might be used in the implementation of a flux control motor system.
Figure 7:
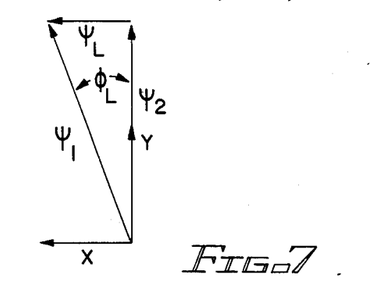
FIG. 7 is a flux diagram illustrating the relationships of the flux vectors referenced in FIG. 6.

Referring now to FIG. 6, there is shown a functional block diagram of a phase lock loop which utilizes the flux ALPHA and flux BETA signals for generating phase A, B and C current commands for controlling operation of an AC motor. Before describing FIG. 6, reference is made to FIG. 7 which shows a vector diagram of the quantities being controlled by the phase lock loop. The vector $\psi_2$ represents rotor flux. The vector $\psi_L$ is a leakage flux perpendicular to vector $\psi_2$. The net vector $\psi_1$, is the sum of $\psi_2$ and $\psi_L$ and represents the stator flux. The direction of the rotor flux is considered to be the Y direction and is the direction in which the flux producing current is applied. The direction perpendicular to that is the X-direction and is the direction in which the torque producing current is applied. Flux ALPHA and flux BETA provide the orientation to the vector $\psi_1$. However, it is desireable to develop the excitation voltages by reference to vector $\psi_2$, i.e., at an angle which is oriented to the rotor flux vector $\psi_2$. The vector difference between vectors $\psi_1$ and $\psi_2$ is vector $\psi_L$ which displaces the stator and rotor vectors by an angle $\Phi_L$. Thus, the phase lock loop is required to lock on vector $\psi_2$ and this is accomplished by introducing a compensating value into the loop.

Turning now to FIG. 6, the flux ALPHA ($\psi\alpha$) and flux BETA ($\psi\beta$) values are input to a two-phase discriminator circuit 60 of a type well known in the art. Sine and cosine values are also supplied to circuit 60. The output of circuit 60 is a phase error signal. The correction factor for $\psi_L$ is summed with the phase error signal and the result is applied to a proportional plus integral (PI) circuit 62. The signal from PI circuit 62 is then integrated to create a $\gamma$PLL signal which drives a rotator 64 of a type well known in the art to derive the $I_A$, $I_B$ and $I_C$ current command signals for controlling motor operation. The sine and cosine values are easily obtained from a look-up table 68 for application to circuit 60. The $\psi_L$ correction factor is obtained from the product of the real component of current, Ireal, and a leakage value L94. By injecting the $-\psi_L$ factor, the phase lock loop locks on a frequency a selected value displaced from rotor flux. It should be noted that the amount of displacement varies with load and is automatically adjusted by use of the Ireal value in computing $\psi_L$.

A circuit block 66 computes the Ireal by demodulating the $I_{ALPHA}$ and $I_{BETA}$ values obtained by three-phase to two-phase conversion of the values of Ia, Ib and Ic currents in the motor. The demodulated Ireal value is a DC component in steady state. The operation is a typical coordinate transformation which uses the phase lock loop output, $\gamma_{PLL}$, to demodulate measured current feedback signals, $I_{ALPHA}$ and $I_{BETA}$, to produce an Ireal, a real component of current, where Ireal represents current in the X-direction in the motor. The $\gamma_{PLL}$ value is an angle obtained from integration of the rotation frequency, $\omega_{PLL}$, which is the output of the PI block 62.

During continuous uni-directional operation of the drive, the flux integrators and the PEAK_DETECT and DC_CORRECT logic function properly since their state information accurately reflects recent history. In other words, the integrators contain valid quadrature components of flux, appropriately lagging the voltage inputs, and the peak detector logic for each phase is anticipating the proper peak (minimum or maximum) with accurate knowledge of the value of the previous peak. However, upon conditions of start-up, frequency reversal, or any transition to the voltage model without accurate history, this state information is generally incorrect. Thus, some means of establishing proper initial conditions of state information is necessary.

Certain conditions require initialization of the peak detector logic only, and other conditions require complete initialization of the flux integrators as well as the peak detector logic. Therefore, two initialization procedures are defined: INIT_PEAK_DETECTOR, and INIT_VOLTAGE_MODEL. The INIT_PEAK_DETECTOR procedure is called by the INIT_VOLTAGE_MODEL procedure. For example, upon start-up, the INIT_VOLTAGE_MODEL procedure is called while on reversal, only the INIT_PEAK_DETECTOR procedure is called.

Figure 8:
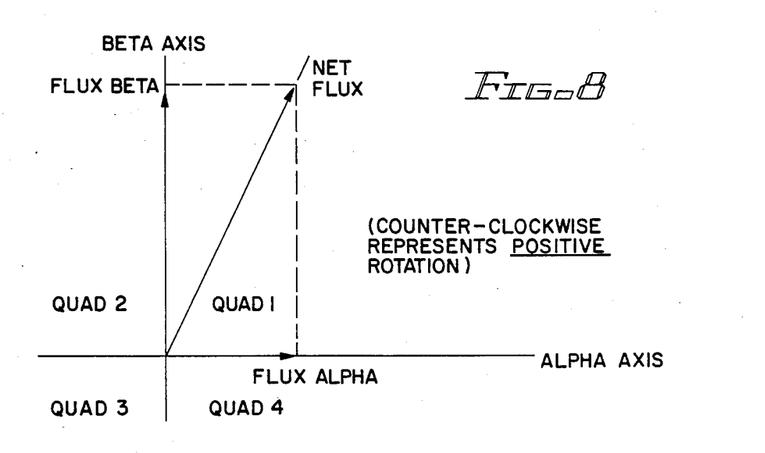
FIG. 8 is a four quadrant diagram illustrating the orientation of flux vectors.
Figure 9:
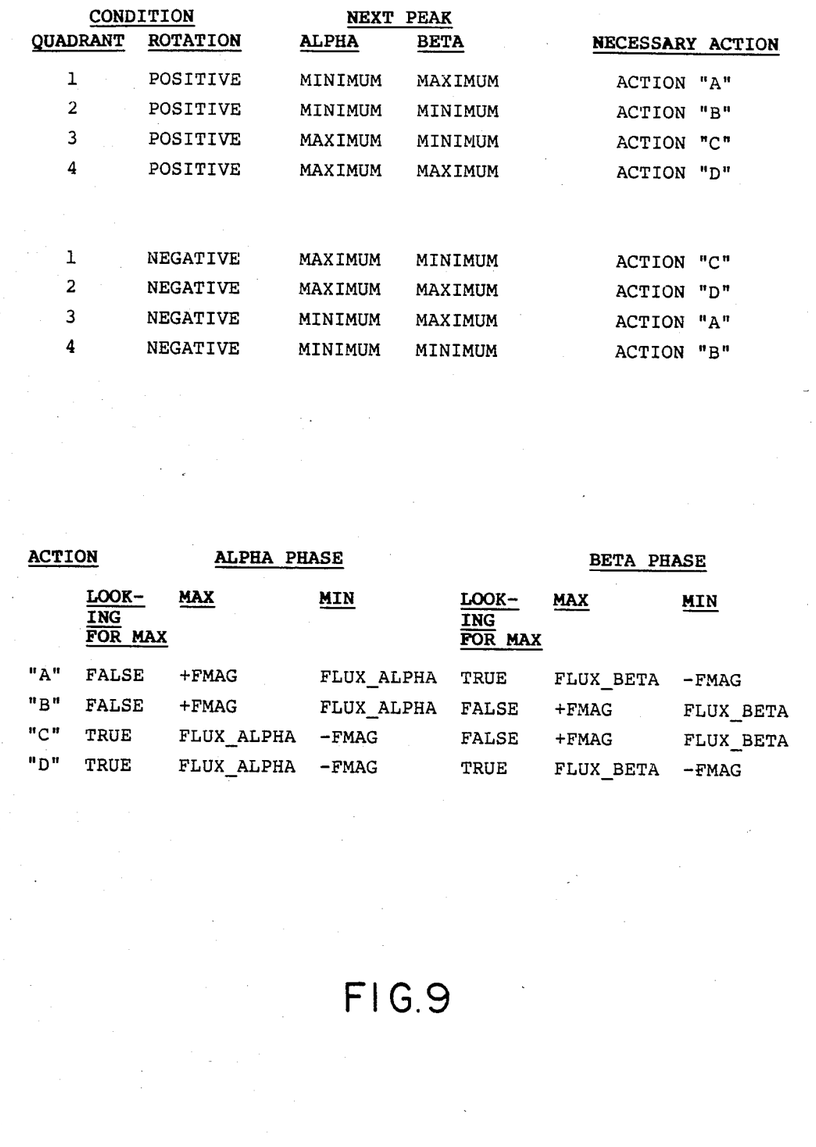
FIG. 9 is a first and second table which identify conditions and a corresponding action required to implement initialization of the peak detect and DC correct logic associated with the flux integrators.

Turning first to the INIT_PEAK_DETECTOR procedure and referring to FIG. 8, one can see that if the quadrant of the net flux vector is known, along with an indication of the direction of its net rotation, then the sense (MAX or MIN) of the next expected peak for each phase (ALPHA and BETA) is defined. This information is necessary and sufficient to define the values to which the following variables should be initialized (see FIG. 5): LOOKING_FOR_MAX (bit), MAX (multi-bit), MIN (multi-bit). LOOKING_FOR_MAX is initialized True or False, and MAX and MIN are set to either the instantaneous value of FLUX or to plus or minus FMAG, as given by the table of FIG. 9. There are eight different combinations of quadrant and direction, each calling for one of four different sets of initialization actions. The first table of FIG. 9 identifies a condition and a corresponding action. The second table describes the corresponding action by defining the actual variable values. Additionally, the PEAK_FOUND and DC_CORRECT bits for each phase should be cleared to indicate that thee is no need for an instantaneous DC correction or adjustment to the long-term correction term until the next peak is found.

Determination of the locus and direction of motion of the flux can be accomplished by various means. A convenient source of this information is provided by the phaselock loop of FIG. 6. Quadrant information can be derived from the output angle γPLL of the loop, taking into account phase shifts defined by the phase discriminator 60. Direction of rotation is best represented by the sign of the integral term in the PI loop filter 62, which provides a relatively smooth measure of PLL frequency. A refinement to the determination of locus would take into account the additional load-dependent phase shift between the flux vector and the angle of the PLL due to the compensation for leakage inductance introduced into the PLL.

Considering now the INIT_VOLTAGE_MODEL procedure, it will be appreciated that initialization of the entire voltage model involves initialization of the flux integrators to nominal values at proper phase, and subsequent initialization of the PEAK_DETECT and DC_CORRECT logic. In a system with phaselock loop 60, the angle is easily defined by using the output angle γPLL of the PLL 60. Again, a refinement to the determination of locus would take into account the additional LOAD_DEPENDENT phase shift between the flux vector and the output angle γPLL of PLL 60 due to the compensation for leakage inductance introduced into the PLL 60. The initialization action to be performed requires setting values and the following steps:

(1) FAMG=NOMINAL
(2) FLUX_ALPHA=ALPHA projection of FMAG at angle defined by γ_PLL;
(3) FLUX_BETA=BETA projection of FMAG at angle defined by γ_PLL;
(4) Call INIT_PEAK_DETECTOR procedure.

As will be seen from the previous description of INIT_PEAK_DETECTOR procedure, this last procedure merely adds the further steps of setting FMAG, i.e., flux magnitude, at a nominal value and establishing ALPHA and BETA flux components in accordance with the output of PLL 60.

While the principles of the invention have now been made clear in an illustrative embodiment, there will become obvious to those skilled in the art many modifications in structure, arrangement, and components used in the practice of the invention and otherwise which are particularly adapted for specific operating requirements without departing from those principles. The appended claims are therefore intended to cover and embrace any such modifications, within the limits only of the true spirit and scope of the invention.

What is claimed is:

1. A method for eliminating direct current components of a flux vector signal representative of a rotating flux field in an alternating current polyphase dynamoelectric machine, the machine having at least one electrical power terminal for each phase, the method comprising the steps of:
   measuring machine terminal voltage at each machine power terminal;
   converting the measured machine terminal voltage to equivalent first and second two-phase voltage representative signals;
   integrating each of the first and second signals for generating corresponding flux vector component representative signals, each of the flux vector representative signals varying sinusoidally;
   detecting consecutive maximum and minimum peaks of each of the sinusoidal flux vector representative signals;
   developing a signal representative of a direct current (DC) component of each of the flux vector representative signals by determination of a voltage midpoint between the detected consecutive maximum and minimum peaks; and
   subtracting the corresponding direct current component signal from a respective one of each of the first and second signals for eliminating any direct current component in the flux vector signals.

2. Method of claim 1 further comprising the steps of:
   integrating each of the DC component representative signals to generate corresponding long term correction signals; and
   subtracting each of the long term correction signals from corresponding ones of the first and second voltage representative signals.

3. Method of claim 2 further comprising the steps of generating a periodic waveform having no DC component when the dynamoelectric machine is not energized, and using the periodic waveform signal added to the measured voltage at the machine terminals for establishing an initial value of long term correction signal for when the machine is energized.

4. The method of claim 1 and including the steps of:
   applying a DC current to the machine terminals for a predetermined time period when the machine is not running; and
   initializing the flux vector representative signals in amplitude and phase to match the values corresponding to the flux induced by the impressed DC current.

5. In a system for controlling a polyphase alternating current electric motor using an electric current control signal oriented to a computed rotor flux vector, a method for developing the current control signal from motor terminal voltage comprising the steps of:
   sensing polyphase motor terminal voltage and converting the sensed voltage to a two-phase representation thereof;
   converting each phase of the two-phase representation to a corresponding pulse train having a variable pulse repetition rate proportional to the amplitude of the sensed motor voltage;
   counting the pulses in the pulse train;
   sampling the counted pulses at periodic intervals;

obtaining a differentiated value by determining the difference in count value between adjacent samples;

integrating the differentiated value to obtain a signal representative of a corresponding component of flux in the motor;

determining sequential maxima and minima of each flux component signal;

comparing the value of each pair of sequential maxima and minima for obtaining an error value; and modifying the flux signal by a value proportional to the error value.

6. The method of claim 5 and including:

determining the direction of rotation of a vector representative of the rotor flux;

sensing a change in the direction of rotation of the rotor flux vector;

identifying the sense of the next peak to be detected based upon the present flux vector angular orientation and direction of rotation;

re-initializing the peak detector to detect the next identified peak to thereby inhibit generation of instantaneous errors at reversal.

7. The method of claim 5 and including the step of:

applying a direct current to the motor prior to start-up for establishing an initial rotor flux having a predetermined orientation.

8. The method of claim 7 including the step of:

initializing the flux integrator whereby alternating current applied to the motor is initiated in correct amplitude and phase orientation with respect to the initial rotor flux.

9. The method of claim 8 and including:

applying a simulated flux signal to the flux integrator for establishing initial conditions which correct for initial DC offset.

* * * * *